(12) United States Patent
Sadri et al.

(10) Patent No.: US 7,826,965 B2
(45) Date of Patent: Nov. 2, 2010

(54) SYSTEMS AND METHODS FOR DETERMINING A RELEVANCE RANK FOR A POINT OF INTEREST

(75) Inventors: Pasha Sadri, San Jose, CA (US); Vineet Gossain, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1539 days.

(21) Appl. No.: 11/155,158

(22) Filed: Jun. 16, 2005

(65) Prior Publication Data
US 2006/0287810 A1     Dec. 21, 2006

(51) Int. Cl.
*G01C 21/00* (2006.01)
(52) U.S. Cl. ............... 701/200; 701/201; 701/202; 701/209; 340/905; 340/988; 340/995.1
(58) Field of Classification Search ............. 701/200, 701/202, 209; 707/3; 340/905, 988, 995.1; 705/5
See application file for complete search history.

(56) References Cited

U.S. PATENT DOCUMENTS

| | | | |
|---|---|---|---|
| 5,751,228 A * | 5/1998 | Kamiya et al. .............. | 340/988 |
| 5,802,492 A | 9/1998 | DeLorme et al. | |
| 5,818,455 A | 10/1998 | Stone et al. | |
| 5,884,218 A | 3/1999 | Nimura et al. | |
| 5,948,040 A * | 9/1999 | DeLorme et al. ........... | 701/201 |
| 5,982,298 A * | 11/1999 | Lappenbusch et al. ...... | 340/905 |
| 6,122,593 A * | 9/2000 | Friederich et al. .......... | 701/202 |
| 6,127,945 A * | 10/2000 | Mura-Smith ............... | 340/988 |
| 6,148,260 A | 11/2000 | Musk et al. | |
| 6,202,023 B1 * | 3/2001 | Hancock et al. ............. | 701/201 |
| 6,240,360 B1 | 5/2001 | Phelan | |
| 6,249,742 B1 * | 6/2001 | Friederich et al. ........... | 701/202 |
| 6,297,748 B1 * | 10/2001 | Lappenbusch et al. ...... | 340/905 |
| 6,307,573 B1 | 10/2001 | Barros | |
| 6,321,158 B1 | 11/2001 | DeLorme et al. | |

(Continued)

OTHER PUBLICATIONS

Cederoth, R.A. et al. (Aug. 19, 2004). "Expedia, Inc.'s Third Supplemental Objections and Responses to Civix's First Set of Interrogatories," *Civix-DDI, LLC v. Cellco Partnership d/b/a Verizon Wireless, Expedia, Inc., Travelscape, Inc. and Verizon Information Services, Inc.*, United States District Court for the Northern District of Illinois, Eastern Division, Case No. 03-C-3972, 12 pages.

(Continued)

*Primary Examiner*—Thomas G Black
*Assistant Examiner*—Wae Louie

(57) ABSTRACT

The present invention provides systems and methods for computing a relevance rank or score of a point of interest based on its proximity to clusters of other points of interest (POI). The methods of the present invention are based upon novel approaches that use location information and weighting functions in order to filter and sort searches of hotels, destinations, and other properties or other points of interest. In one approach, a relevance rank of a target POI at a location is determined by obtaining a plurality of component POIs that are each within the same geographical region as the target POI. Component POI scores for each of the component POIs are calculated as a function of a distance between the locations of the component POI and the location of the target POI. The relevance rank of the target POI is a combination of the plurality of component POI scores.

47 Claims, 12 Drawing Sheets

U.S. PATENT DOCUMENTS

| | | | |
|---|---|---|---|
| 6,405,129 | B1 | 6/2002 | Yokota |
| 6,430,602 | B1 | 8/2002 | Kay et al. |
| 6,493,630 | B2 | 12/2002 | Ruiz et al. |
| 6,711,474 | B1* | 3/2004 | Treyz et al. ..................... 701/1 |
| 6,772,142 | B1 | 8/2004 | Kelling et al. |
| 6,836,270 | B2 | 12/2004 | Du |
| 6,928,364 | B2* | 8/2005 | Tsuyuki ..................... 701/200 |
| 7,080,021 | B1* | 7/2006 | McCulloch ..................... 705/5 |
| 7,080,022 | B2* | 7/2006 | McCulloch ..................... 705/5 |
| 7,082,365 | B2* | 7/2006 | Sheha et al. ................. 701/209 |
| 7,092,892 | B1 | 8/2006 | Sobalvarro et al. |
| 7,249,160 | B2 | 7/2007 | Nozaki et al. |
| 7,321,826 | B2* | 1/2008 | Sheha et al. ................. 701/209 |
| 7,373,244 | B2* | 5/2008 | Kreft .......................... 701/207 |
| 7,447,509 | B2 | 11/2008 | Cossins et al. |
| 7,529,736 | B2* | 5/2009 | Katariya et al. ..................... 1/1 |
| 7,555,725 | B2 | 6/2009 | Abramson et al. |
| 2002/0067379 | A1 | 6/2002 | Kenyon et al. |
| 2002/0116336 | A1* | 8/2002 | Diacakis et al. ............... 705/51 |
| 2003/0036848 | A1* | 2/2003 | Sheha et al. ................. 701/209 |
| 2003/0055555 | A1* | 3/2003 | Knockeart et al. .......... 701/202 |
| 2003/0069687 | A1* | 4/2003 | Tsuyuki ..................... 701/200 |
| 2003/0093419 | A1 | 5/2003 | Bangalore et al. |
| 2003/0182052 | A1 | 9/2003 | DeLorme et al. |
| 2003/0220835 | A1* | 11/2003 | Barnes, Jr. ................... 705/14 |
| 2004/0044469 | A1 | 3/2004 | Bender et al. |
| 2004/0059659 | A1 | 3/2004 | Safaei et al. |
| 2004/0073538 | A1 | 4/2004 | Leishman et al. |
| 2004/0133339 | A1* | 7/2004 | Braun-Huon ............... 701/200 |
| 2004/0148207 | A1 | 7/2004 | Smith et al. |
| 2005/0027705 | A1 | 2/2005 | Sadri et al. |
| 2005/0088322 | A1* | 4/2005 | Silverbrook ............. 340/995.1 |
| 2006/0026170 | A1 | 2/2006 | Kreitler et al. |
| 2006/0074547 | A1* | 4/2006 | Kaufman et al. ............ 701/200 |
| 2006/0271277 | A1 | 11/2006 | Hu et al. |
| 2006/0287810 | A1* | 12/2006 | Sadri et al. .................. 701/200 |
| 2007/0032942 | A1* | 2/2007 | Thota ......................... 701/200 |
| 2007/0156332 | A1 | 7/2007 | Wailes et al. |
| 2007/0225902 | A1* | 9/2007 | Gretton et al. .............. 701/202 |
| 2008/0097688 | A1* | 4/2008 | Tashev et al. ............... 701/200 |
| 2008/0312819 | A1* | 12/2008 | Banerjee ..................... 701/202 |

OTHER PUBLICATIONS

Cederoth, R.A. et al. (Feb. 28, 2005). "Travelscape, Inc.'s Sixth Supplemental Objections and Responses to Civix's First Set of Interrogatories," *Civix-DDI*, LLC v. *Expedia, Inc., Travelscape, Inc. and Verizon Information Services*, Inc., United States District Court for the Northern District of Illinois, Eastern Division, Case No. 03-C-3972, 28 pages.

Chefitz, J. et al. (May 4, 2005). "Verizon Information Services's Second Supplemental Objections and Response to Civix's Interrogatory No. 3," *Civix-DDI*, LLC v. *Expedia, Inc.; Travelscape, Inc.; and Verizon Information Services*, Inc., United States District Court for the Northern District of Illinois, Eastern Division, Case No. 03-C-3972, 7 pages.

Delorme, Inc. (2002) "Street Atlas USA 2003 User Guide," located at <http://support.radioshack.com/support_computer/doc69/69511.pdf>, pp. 1-141.

Expedia, Inc. (2003). "Expedia.com®," located at <http://www.expedia.com/pub/agent.dll?qscr=htfv&itid=&itdx=&itty=&from=f>, visited on May 5, 2003, 6 pages.

Expedia, Inc. (2006). "Expedia.com," located at <http://www.expedia.com/Default.asp?CCheck=1&>, visited on Nov. 2, 2006, 2 pages.

GIS Development.Net. (Date Unknown). "GDT and TrafficCast to Deliver Real-Time Traffic Information," located at <http://www.gisdevelopment.net/news/viewn.asp?id=GIS:N_ezpcygua...>, visited on Feb. 14, 2005, 2 pages.

Hornbæk, et al. (Dec. 2002). "Navigation Patterns and Usability of Zoomable User Interfaces With and Without an Overview," ACM Transactions on Computer-Human Interaction 9(4):362-389.

Hrut, C.B. (Sep. 1993). "Navigation Technologies: Executive Summary," *Mobile World Conference Proceedings*, 22 pages.

International Preliminary Report on Patentability issued Apr. 16, 2008, for PCT Application No. PCT/US2006/040270, filed Oct. 13, 2006, 7 pages.

International Preliminary Report on Patentability mailed Mar. 19, 2009, for PCT Application No. PCT/US2006/019223, filed on May 17, 2006, 8 pages.

International Search Report and Written Opinion mailed Jan. 22, 2008, for PCT Application No. PCT/US2006/019223, filed on May 17, 2006, 8 pages.

International Search Report and Written Opinion mailed Mar. 6, 2007, for PCT Application No. PCT/US2006/040270 filed Oct. 13, 2006, 9 pages.

Trafficcast, Inc. (Date Unknown). "The Power of Prediction™: Add Value," located at <http://www.trafficcast.com/index.html>, visited on Feb. 14, 2005, 1 page.

Trafficcast, Inc. (Date Unknown). "The Power of Prediction™: Company Vision," located at <http://www.trafficcast.com/corporate/about.html>, visited on Feb. 14, 2005, 1 page.

Trafficcast, Inc. (Date Unknown). "The Power of Prediction™: Data Products and Services," located at <http://www.trafficcast.com/services/service.html>, visited on Feb. 14, 2005, 1 page.

Trafficcast, Inc. (Date Unknown). "The Power of Prediction™: Market Segments," located at <http://www.trafficcast.com/services/Marketseg.html>, visited on Feb. 14, 2005, 1 page.

Trafficcast, Inc. (Date Unknown). "The Power of Prediction™: Markets with Real Time Traffic Data," located at <http://www.trafficcast.com/slides/TrafficCastTTAMarket.html>, visited on Feb. 14, 2005, 3 pages.

Trafficcast, Inc. (Date Unknown). "The Power of Prediction™: Partnerships and Customers," located at <http://www.trafficcast.com/Customers/index.html>, visited on Feb. 14, 2005, 4 pages.

Trafficcast, Inc. (Date Unknown). "The Power of Prediction™: Personalized Travel-Time Reports," located at <http://www.trafficcast.com/demonstrations/reports/text/alerts.html>, visited on Feb. 14, 2005, 1 page.

Trafficcast, Inc. (Date Unknown). "The Power of Prediction™: Products and Services," located at <http://www.trafficcast.com/services/index.html>, visited on Feb. 14, 2005, 1 page.

Trafficcast, Inc. (Date Unknown). "The Power of Prediction™: Time-Dependent Routing," located at <http://www.trafficcast.com/demonstrations/routing/time_dependant/pre_trip_planning.html>, visited on Feb. 14, 2005, 2 pages.

Trafficcast, Inc. (Date Unknown). "The Power of Prediction™: TrafficCast Demonstrations," located at <http://www.trafficcast.com/demonstrations/index.html>, visited on Feb. 14, 2005, 1 page.

Trafficcast, Inc. (Date Unknown). "The Power of Prediction™: TrafficCast Value Proposition," located at <http://www.trafficcast.com/services/valueprop.html>, visited on Feb. 14, 2005, 1 page.

Trafficcast, Inc. (Date Unknown). "The Power of Prediction™: TrafficCast Speed Map," located at <http://www.trafficcast.com/demonstrations/maps/smartmap.html>, visited on Feb. 14, 2005, 1 page.

\* cited by examiner

Los Angeles Hotels (100)

---

Matching hotel deals: Los Angeles Hotels    SPONSOR LINKS
- Los Angeles: Holiday Inn Los Angeles
  Holiday Inn Los Angeles Official Site: Lowest Internet...
- Los Angeles: Low Price on Hotels
  Orbitz Guaranteed lowest rates on OrbitzSaver hotels...
- Los Angeles: Great Rooms, Great Rates
  Travelocity Lowest prices on 16,000+ hotels. Guaranteed!
- Los Angeles: Find Great Hotel Deals
  hotels.com Book Online Today & Save with Low Rates...

View more hotel deals for Los Angeles

---

610 → Search hotels by date    612 →    View Results on Map

REFINE RESULTS BY        SORT BY: Close To | Popularity | Lowest Price | Highest Class 708 → You refined by:    702-1 →
Close To: Restaurants    Century Plaza Hotel & Spa-A
[undo]    Westin Hotel
    Rated #1 for all Los Angeles Hotels
Price    (4 Reviews, 9 Guides)
$0 - $49.99 (7)    User Rating: ★★★★☆ - Rate it!
$50 - $99.99 (48)    Hotel Class: ★★★★☆
$100 - $149.99 (23)    Close To: Many Restaurants, some
$150 - $249.99 (8)    Attractions
$250 - $399.99 (4)    Average Price: $169.00
    Neighborhood: Beverly Hills And The    ← 702-1a
    Westside [Map it]

Hotel Class    702-2 →
5 Stars (3)
4+ Stars (16)    Sofitel Los Angeles
3+ Stars (48)    Rated #2 for all Los Angeles Hotels
2+ Stars (77)    (2 Reviews, 7 Guides)
    User Rating: ★★★☆☆ - Rate it!
    Hotel Class: ★★★★☆
    Close To: Some Restaurants
Located Near    Average Price: $145.00
J. Paul Getty Center    Neighborhood: Hollywood [Map it]    ← 702-2a
(The)
La Brea Tar Pits    702-3 →
Los Angeles County
Museum Of Art    Le Meridien Beverly Hills
Museum Of Tolerance    Rated #3 for all Los Angeles Hotels
Griffith Observatory    (1 Reviews, 17 Guides)
See more locations    User Rating: ★★★★☆ - Rate it!
    Hotel Class: ★★★★☆
    Close To: Many Shops, Some
    Restaurants
616 → Close To    Average Price: $178.96
    Restaurants    Neighborhood: Beverly Hills And The    ← 702-3a
618 → Night Life    Westside [Map it]
620 → Attractions

Neighborhood
Downtown (38)
Beverly Hills And The Westside (22)
LAX And Inglewood (18)
Hollywood (14)
The Valley (4)
See more neighborhoods

Amenity
Swimming Pool (60)
Pets Allowed (26)
Fitness Center (45)
Wheelchair Accessible (70)
Spa/Massage (18)
See more amenities

Hotel Chain
Best Western (6)
Comfort Inns & Suites (4)
Super 8 Motels (4)
Marriott Hotels & Resorts (4)
Radison Hotels & Resorts (3)
See more hotel chains

Type
Hotel (66)
Motel (15)
Conference Center (6)
All Suite (6)
Inn/Lodge (5)
See more types

710 →

The Westin Bonaventure Hotel and Suites
Rated #4 for all Los Angeles Hotels
(3 Reviews, 8 Guides)
User Rating: ★★★★☆ - Rate it!
Hotel Class: ★★★★☆
Close To: 20 Attractions, 34 Restaurants
Average Price: $139.00
Neighborhood: Downtown [Map it]     ← 710a

712 →

Westin Los Angeles Airport
Rated #5 for all Los Angeles Hotels
(11 Reviews, 9 Guides)
User Rating: ★★★★☆ - Rate it!
Hotel Class: ★★★☆☆
Close To: 10 Attractions, 15 Restaurants
Average Price: $89.00
Neighborhood: LAX And Inglewood [Map it]   712a

714 →

Millennium Biltmore Hotel
Rated #6 for all Los Angeles Hotels
(6 Reviews, 7 Guides)
User Rating: ★★★☆☆ - Rate it!
Hotel Class: ★★★★☆
Close To: 10 Attractions
Average Price: $345.32
Neighborhood: Downtown [Map it]     714a

716 →

Four Seasons Hotel At Beverly Hills
Rated #7 for all Los Angeles Hotels
(8 Guides)
User Rating: ★★★★☆ - Rate it!
Hotel Class: ★★★★★
Close To: 10 Night Life, 32 Restaurants
Average Price: $350.00
Neighborhood: Beverly Hills And The Westside [Map it]    716a

YAHOO! TRAVEL Sign In / New User? Sign Up

Travel Home - My Travel - Help

Travel > California > Los Angeles > Hotels > Century Plaza Hotel & Spa-A Westin Hotel

[ Search Travel ]

Los Angeles, CA: Overview  Hotels  Things to do  Restaurants  Map  Flights  Cars  Vacations  Deals

Century Plaza Hotel & Spa-A Westin Hotel, Los Angeles   ✉ Email this page  🖨 Print
- Rated # 1 in Los Angeles 2025 Ave of the Stars, Los Angeles, CA 90067 - map
from $169.00/night - Reserve Now

- Hotel Class: ★★★★☆
- User Rating: ★★★★☆ 4 Reviews - Write a Review
- Image search for Century Plaza Hotel & Spa-A Westin Hot
- 804 • Description - Amenities: Swimming Pool, Pets Allowed, Fitness Center
- Close To: Many Restaurants, Some Attractions Been here before?
Tell us what you think!

Rate it: ☆☆☆☆☆

[ Save Rating ]

Matching hotel deals: Los Angeles Hotels         SPONSOR LINKS
- Hotel Savings - Los Angeles Hotels
  hotels.com Low prices guaranteed on Los Angeles hotels, or choose...
- Los Angeles Hotel Reservations
  xcessasia.com Big savings, discounts up to 70%. Low rates and 15...
- Century Plaza Hotel & Spa-A Westin Hotel: 110% Low Price Guaranteed
  Lodging.com Get a room now and get 4% back!
- Century Plaza Hotel & Spa-A Westin Hotel: Low Price on Hotels
  Orbitz Guaranteed lowest rates on OrbitzSaver hotels. Just Orbitz...
- View more hotel deals for Los Angeles

Map of Century Plaza Hotel & Spa-A Westin Hotel

★ Century Plaza Hotel & Spa-A Westin Hotel
Driving Directions - View Map

810

Yahoo! User Reviews of Century Plaza Hotel & Spa-A Westin Hotel

- ★★★★☆ Great Location for Hollywood and Santa Monica....
  A pricey area to stay, but if you want comfort and a little quite time in the hollywood, santa monica area, this is the hotel. The parking lot the this hotel is located towards the back of the hotel ... more
  by Julian from Sunnyvale, ca 09/01/04

- ★★★★★ Awesome Hotel
  The Century Plaza is by far one of the most loveliest hotel I've ever stayed in. The all whire rooms were quite charming & the service was simply splendid. If our conference is ever sheduled ... more
  by A Yahoo! Traveler 09/30/04

- ★☆☆☆☆ Worst hotel experience ever
  I was expecting great things from this hotel, especially for the price and the fact it was a Westin Hotel. My stay around the Easter weekend turned out to be the worst hotel experience ever. First ... more
  by Aussie Traveller from Sydney 04/08/05

User Reviews from the Web
- Century Plaza Hotel and Spa-- 4 Traveler Review
  They were on point when they named the beds...HEAVENLY. Extremely comfortable. Bathroom was beautiful, clean and modern. View of fountains was nice. Food was good Map nearby:
☑ 🏨 Hotels ← 820
☐ 🍴 Restaurants
☐ 🛍 Shopping
☐ 🎭 Things to do
☐ 🎬 Entertainment
( Get Map )

What's Nearby

Hotels
- The St Regis Los Angeles Hotel & Spa (0.08 miles)
- Park Hyatt Los Angeles at Century City (0.26 miles)
- Courtyard by Marriott Century City (0.38 miles)
- Holiday Inn Express (0.40

SYSTEMS AND METHODS FOR DETERMINING A RELEVANCE RANK FOR A POINT OF INTEREST

1. FIELD OF THE INVENTION

Systems and methods for searching and sorting information on a computer network are provided. More particularly, computer systems and methods for computing the relevance rank of a point of interest based on its proximity to clusters of other points of interest are provided.

2. BACKGROUND OF THE INVENTION

Several tools for finding hotels and other points of interest are available on the Internet. For example, referring to FIG. 10, Expedia.com allows a user to search for a hotel in a city, near an airport, near a particular attraction (e.g., the Statue of Liberty), or near a particular address. Several other websites offer comparable services. For example, Hotel.com, Priceline.com, and Orbitz.com each allow a user to search for hotels in specific cities and a subset of these websites allow a user to find a hotel near a specific attraction. These services are satisfactory for business travels and more, generally, for users who are familiar with the geographic region where they seek a hotel room. However, travelers who are planning a vacation destination or, for other reasons, want to obtain a hotel room in a location of interest must make do with the limited offerings provided by existing Internet based travel services.

To understand the deficiencies in the prior art, consider a traveler that would like to stay in San Francisco. Using, for example, the Expedia.com illustrated in FIG. 10, the user specifies "San Francisco," a check in date, and a check out date. A typical return for such a query provides information on the Grand Hyatt on Union square, the Renaissance Parc Hotel three blocks away from Union Square, the Cathedral Hill hotel in downtown San Francisco, the Hotel Palomar near Market Street, the Hotel Nikko near Union Square, among many others hotels. These hotels are all in San Francisco and a brief synopsis of what the hotels are like, including a description of the attractions near these hotels, is typically provided in response to the query. However, a traveler unfamiliar with San Francisco is forced to manually review the information on each of returned hotels to determine whether the hotels are located in a part of San Francisco that may interest the traveler. Queries such as which hotels are located near museums, which hotels are near good restaurants, and which hotels are nearest to the tourist attractions that most interest San Francisco tourists (Fisherman's wharf, Ghirardelli square, cable cars, Union square, Union Street, etc.) must be manually determined by the user. Certainly, a traveler can use a web site such as Expedia.com or Orbitz.com to identify hotels near a single attraction, for example, Union square. But this is unsatisfactory because the traveler typically does not visit San Francisco to see a single attraction. Thus, in order to guarantee that a hotel is in the vicinity of several attractions, the traveler must do independent research to guarantee that a particular hotel is in an area of San Francisco that is proximate to the attractions that the traveler wants to see.

With the examples provided above, it can be seen that the prior art is deficient in methods for allowing a user to find a hotel or other property that is located close to many points of interest (POIs), such as restaurants, tourist activities, attractions, shopping, night life, parks, etc. Some existing hotel search systems allow users to browse hotel listings and to restrict such listings to a specific city (e.g., San Francisco, Calif.), neighborhood (e.g.: South of Market, San Francisco, Calif.) or even to a defined area surrounding a specific location or address (e.g., 100 Post Street, San Francisco, Calif.). However, such systems do not provided a feature for filtering candidate hotels, properties or other points of interest based on their proximity to clusters of other nearby points of interest. The same need exists in other domains such as real estate. For example, a user may wish to find houses that are close to schools, parks, shopping centers, or other points of interest.

Accordingly, given the above background, what is needed in the art are improved systems and methods for identifying points of interest (e.g., a property such as a hotel), based upon proximity to more than one attraction.

Discussion or citation of a reference herein will not be construed as an admission that such reference is prior art to the present invention.

3. SUMMARY OF THE INVENTION

The present invention addresses many of the shortcomings and drawbacks found in the prior art. Apparatus and methods for computing a relevance rank or score of a target point of interest based on its proximity to clusters of points of interests are provided. The methods of the present invention are based on novel approaches that use location information and weighting functions in order to filter and sort searches of hotels, destinations, as well as other properties (e.g., houses for sale, apartments, or other attractions).

In one embodiment, a method for computing a relevance score of a target point of interest (POI) is based on the proximity of the property to other points of interest. Such a relevance score can, for example, be a function of the following factors: (a) the distance between the target POI and each nearby point of interest, and (b) an independent importance factor, or weight, for each nearby point of interest. In general, the more points of interest near the target POI, and the shorter the distance to each of those points of interests, the higher the relevance, or POI proximity, score.

In some embodiments of the present invention, a method of ranking a target point of interest, such as a hotel or other property or destination, includes determining the location of the target point of interest and generating a list of component points of interest within the vicinity of the target point of interest. For each component point of interest in the list, a component point of interest score is calculated as a function of the distance between the component point of interest and the target point of interest. Then, a target point of interest score is computed for the target point of interest by summing up all the component point of interest scores. In one embodiment, the magnitude of the component point of interest score is inversely related to the distance between the component point of interest and the target point of interest. In some embodiments, other forms of weighting schemes are used to adjust the magnitude of component point of interest scores.

According to another embodiment of the present invention, proximity determinations are used as a method for determining a mutual POI score for ranking, filtering, or sorting suitable locations for a meeting attended by two or more people coming from different geographic locations to attend the meeting. Such locations can include, for example, a restaurant, a bar, a coffee shop, an office, a shopping mall, a store, a park, or any other point of interest.

In other embodiments, the systems and methods of the present invention are applied to other domains such as real estate. For example, the target POIs for which overall scores are calculated can be houses or apartments, and other POIs include, but are not limited to, parks, schools, highway on-ramps, earthquake faults, train tracks, locations of sex offenders, or other locations or points of interest. In such embodiments, the weight for each component POI used to compute a target POI can be assigned based on the candidate POI type. For example, for component POIs that are schools, the weight can be associated with the performance of the school.

In one aspect of the invention provides a method of computing a relevance rank of a target point of interest (POI) at a location. In this method, a plurality of component points of interest is obtained. Each component POI in the plurality of component POIs is within the same geographical region as the target POI location. A plurality of component POI scores is calculated. Each component POI score in the plurality of component POI scores corresponds to a component POI in the plurality of component POI. Furthermore, each respective component POI score in the plurality of component POI scores is determined by a function of a distance between (i) the component POI corresponding to the respective component POI score and (ii) the target POI. In this aspect of the invention, the relevance rank of the target POI is a combination of the plurality of component POI scores.

In some embodiments, a component POI score in the plurality of component POI scores is determined by the distance between (i) the component POI corresponding to the component POI score and (ii) the target POI. In some embodiments, a component POI score in the plurality of component POI scores is determined by an inverse of the distance between (i) the component POI corresponding to the component POI score and (ii) the target POI. In some embodiments, the target POI is a hotel, a house, an apartment, a real estate parcel, a restaurant, a bar, or a school. In some embodiments, a component POI in the plurality of component POI is a restaurant, a hotel, an attraction, an activity, a park, a store, a shopping mall, a school, a highway on-ramp, an earthquake fault, a train track, or a location of a sex offender.

In some embodiments, a component POI score in the plurality of component POI scores is further determined by a weight assigned to the component POI represented by the component POI score. This weight can be determined, for example, by a category parameter, a type parameter, a rating parameter, a quality parameter, a price parameter, or a user preference parameter. In various embodiments, a component POI in the plurality of component POI and the target POI are in the same vicinity when they are in the same state, the same county, or the same city In some embodiments, a component POI is assigned a component POI score of zero when the distance between the component POI and the target POI is greater than a threshold value (e.g., 500 yards or less, 1000 yards or less, one mile or less, between 10 feet and 1 mile). In some embodiments, the distance between the component POI and the target POI is computed as a direct distance between the component POI and the target POI, the driving or walking distance between the component POI and the target POI, or the driving time between the component POI and the target POI. In some embodiments, the first plurality of component POIs consists of between 5 and 1000 POIs, more than five POIs, or less than 10,000 POIs.

Another aspect of the present invention provides a computer system for computing a relevance rank of a target point of interest (POI) at a location. The computer system comprises a central processing unit and a memory, coupled to the central processing unit. The memory stores instructions for accessing a property data structure. This property data structure comprises information about the target POI. The memory further stores instructions for accessing a POI data structure as well as instructions for accessing a proximity processing module. The proximity processing module comprises instructions for obtaining a plurality of component points of interest from the POI data structure, where each component POI in the plurality of component POIs is within the same geographical region as the target POI location. The proximity processing module further comprises instructions for calculating a plurality of component POI scores, where each component POI score in the plurality of component POI scores corresponds to a component POI in the plurality of component POI. Furthermore, each respective component POI score in the plurality of component POI scores is determined by a function of a distance between (i) the component POI corresponding to the respective component POI score and (ii) the target POI. In this aspect of the invention, the relevance rank of the target POI is a combination of the plurality of component POI scores.

Another aspect of the invention provides a computer program product for computing a relevance rank of a target point of interest (POI) at a location. The computer program product comprises a computer readable storage medium and a computer program mechanism embedded therein. The computer program mechanism comprises instructions for accessing a property data structure. The property data structure comprises information about the target POI. The computer program mechanism further comprises instructions for accessing a POI data structure. Further still, computer program mechanism further comprises instructions for accessing a proximity processing module. The proximity processing module comprises instructions for obtaining a plurality of component points of interest from the POI data structure. Each such component POI is within the same geographical region as the target POI. The proximity processing module further comprises instructions for calculating a plurality of component POI scores. Each such component POI score corresponds to a component POI in the plurality of component POI. Furthermore, each respective component POI score in the plurality of component POI scores is determined by a function of a distance between (i) the component POI corresponding to the respective component POI score and (ii) the target POI. In this aspect of the invention, the relevance rank of the target POI is a combination of the plurality of component POI scores.

Still another aspect of the invention provides a method of determining a target location. In the method, a location of a first person associated with the target location is obtained over the Internet. Also, a location of a second person associated with the target location is obtained over the Internet. Then, for each respective candidate location in a plurality of candidate locations, a score is computed. Each respective score is a function of both (i) a distance between the location of the first person and the respective candidate location corresponding to the score and (ii) a distance between the location of the second person and the candidate location corresponding to the score. The candidate location in the plurality of candidate locations that has the best score is deemed to be the target location. In some embodiments, the distance between the location of the first person and the respective candidate location is computed as a direct distance, a driving or walking distance, or as the driving time. In some embodiments, the target location is a meeting place for the first person and the second person. In still other embodiments, the target location is associated with additional people and the location of these additional people is used to identify the target location from among the plurality of candidate locations based on the respective distances of each of the additional people and the geographic positions of each of the candidate locations in the plurality of candidate locations. In some embodiments, the target location is a place for the first person and second person to rent or buy, the location of the first person is the place where the first person works or goes to school, and the location of the second person is the place where the second person works or goes to school.

4. BRIEF DESCRIPTION OF THE DRAWINGS

FIG. 7A is a portion of an exemplary web page displaying a list of hotels, refined using point of interest proximity data calculated and displayed according to an embodiment of the present invention.

FIG. 7B is a portion of the web page of FIG. 7A, including another method for displaying point of interest proximity data in accordance with an embodiment of the present invention.

FIG. 7C is still another portion of the web page of FIG. 7A, including yet another method for displaying point of interest proximity data in accordance with an embodiment of the present invention.

FIG. 8 is a portion of a web page providing details of a particular hotel in accordance with an embodiment of the present invention.

Figure 10:
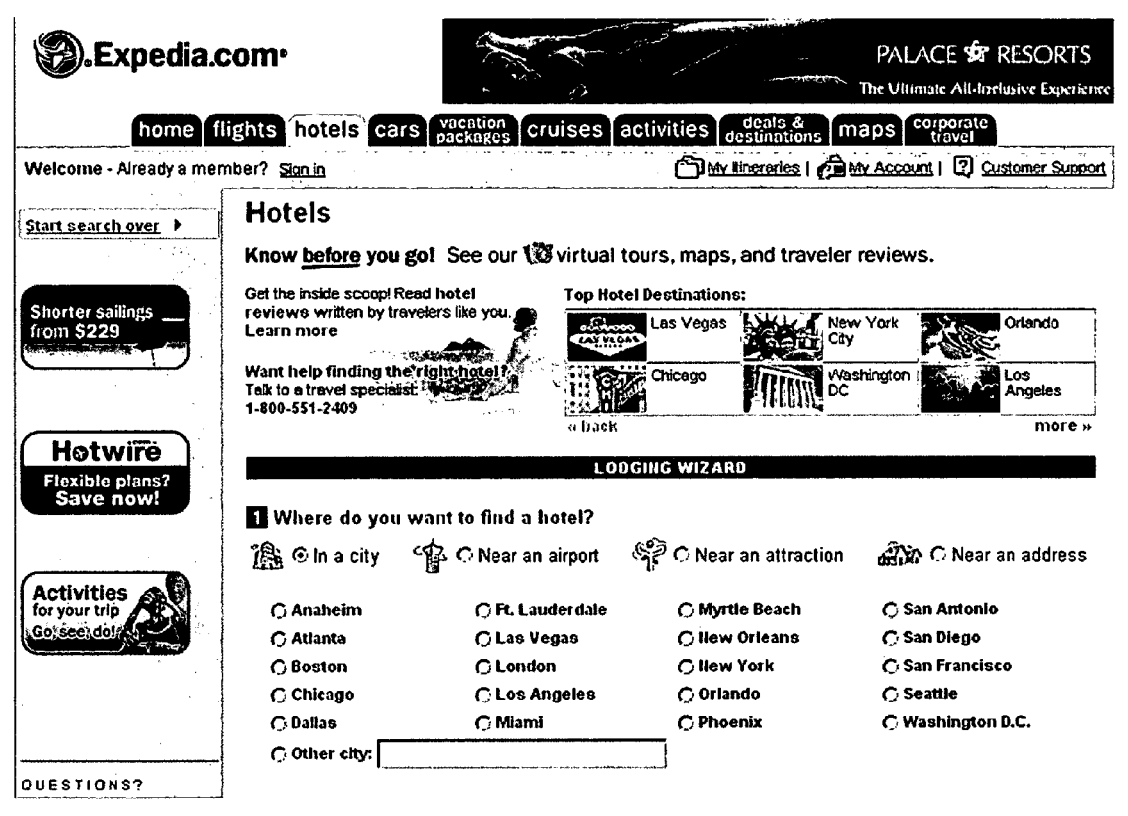

FIG. 10 illustrates a method for identifying a hotel of interest in accordance with the prior art.

Like reference numerals refer to corresponding parts throughout the several views of the drawings.

5. DETAILED DESCRIPTION

The present invention provides apparatus and methods for computing a relevance rank or score of a target point of interest based on its proximity to clusters of other points of interest (termed "component points of interests"). The methods of the present invention are based upon novel approaches that use location information and, optionally, weighting functions in order to filter and sort searches of hotels, other properties, or other points of interest.

Figure 1:
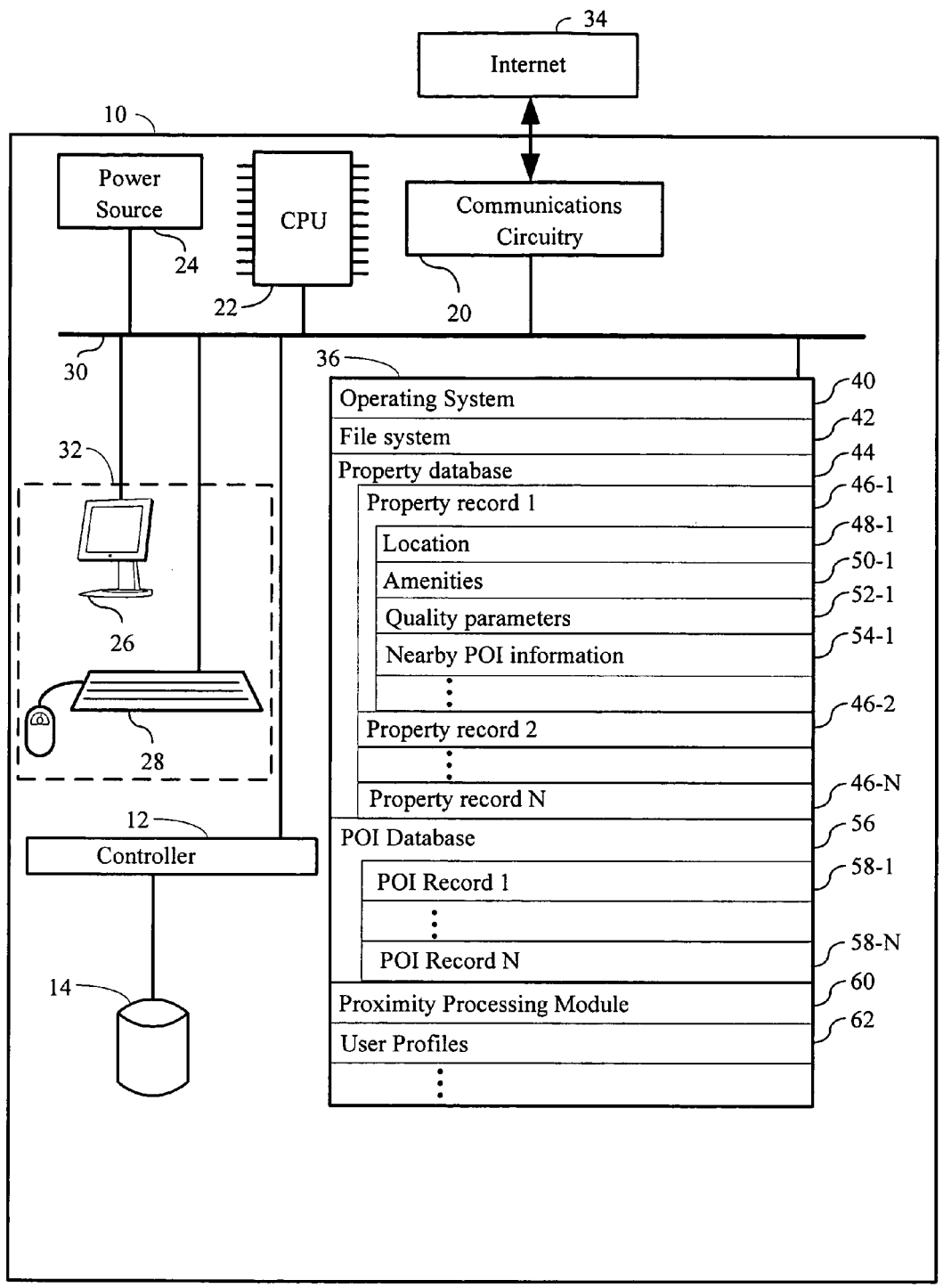
FIG. 1 is a schematic diagram of a computer system for processing and delivering hotel or other property information in accordance with an embodiment of the present invention.

FIG. 1 details an exemplary system that supports the functionality described above. The system is preferably a computer system 10 having:
a central processing unit 22;
a main non-volatile storage unit 14, for example, a hard disk drive, for storing software and data, the storage unit 14 controlled by controller 12;
a system memory 36, preferably high speed random-access memory (RAM), for storing system control programs, data, and application programs, comprising programs and data loaded from non-volatile storage unit 14; system memory 36 may also include read-only memory (ROM);
a user interface 32, comprising one or more input devices (e.g., keyboard 28) and a display 26 or other output device;
a network interface card 20 or other communication circuitry for connecting to any wired or wireless communication network 34 (e.g., the Internet or any other wide area network);
an internal bus 30 for interconnecting the aforementioned elements of the system; and
a power source 24 to power the aforementioned elements.

Operation of computer 10 is controlled primarily by operating system 40, which is executed by central processing unit 22. Operating system 40 can be stored in system memory 36. In addition to operating system 40, in a typical implementation system memory 36 includes:
file system 42 for controlling access to the various files and data structures used by the present invention;
a property database 44 including a plurality of records 46, each record corresponding to a hotel or other property and including, for example, data related to location 48, amenities 50, quality parameters 52, and nearby point of interest (POI) information 54 including POI proximity scores for each property;
a POI database 56 including POI records 58 with location data and other information related to particular restaurants, attractions, activities and/or other points of interest for calculating POI proximity scores according to the present invention;
a proximity processing module 60 for calculating POI proximity scores for each property according to the present invention; and
a user profile module 62 including information regarding user preferences and profiles that can be used to process and display property information to a particular user.

As illustrated in FIG. 1, computer 10 comprises software program modules and data structures. The data structures stored in computer 10 include, for example, property database 44, POI database 56, and optionally, user profile database 62. Each of these data structures can comprise any form of data storage including, but not limited to, a flat ASCII or binary file, an Excel spreadsheet, a relational database (SQL), or an on-line analytical processing (OLAP) database (MDX and/or variants thereof).

In some embodiments, each of the aforementioned data structures stored or accessible to system 10 are single data structures. In other embodiments, such data structures, in fact, comprise a plurality of data structures (e.g., databases, files, archives) that may or may not all be hosted by the same computer 10. For example, in some embodiments, property database 44 comprises a plurality of structured and/or unstructured data records that are stored either on computer 10 and/or on computers that are addressable by computer 10 across the Internet 34 or other forms of wide area networks. In some embodiments, POI database 56 comprises a database that is either stored on computer 10 or is distributed across one or more computers that are addressable by computer 10 across Internet 34. Moreover, other systems, application modules and databases not shown in FIG. 1 can be stored in system memory 36.

In some embodiments, property database 44, POI database 56, proximity processing module 60 and/or user profile database 62 illustrated in FIG. 1 are on a single computer (computer 10) and in other embodiments one or more of such data structures and module are hosted by one or more remote computers (not shown). Any arrangement of the data structures and software modules illustrated in FIG. 1 on one or more computers is within the scope of the present invention so long as these data structures and software modules are addressable with respect to each other across network 34 or by other electronic means. Thus, the present invention fully encompasses a broad array of computer systems.

Now that an overview of a system in accordance with one embodiment of the present invention has been described, various advantageous methods that can be used in accordance with the present invention will now be disclosed in this section in conjunction with FIGS. 2 through 9.

Figure 2:
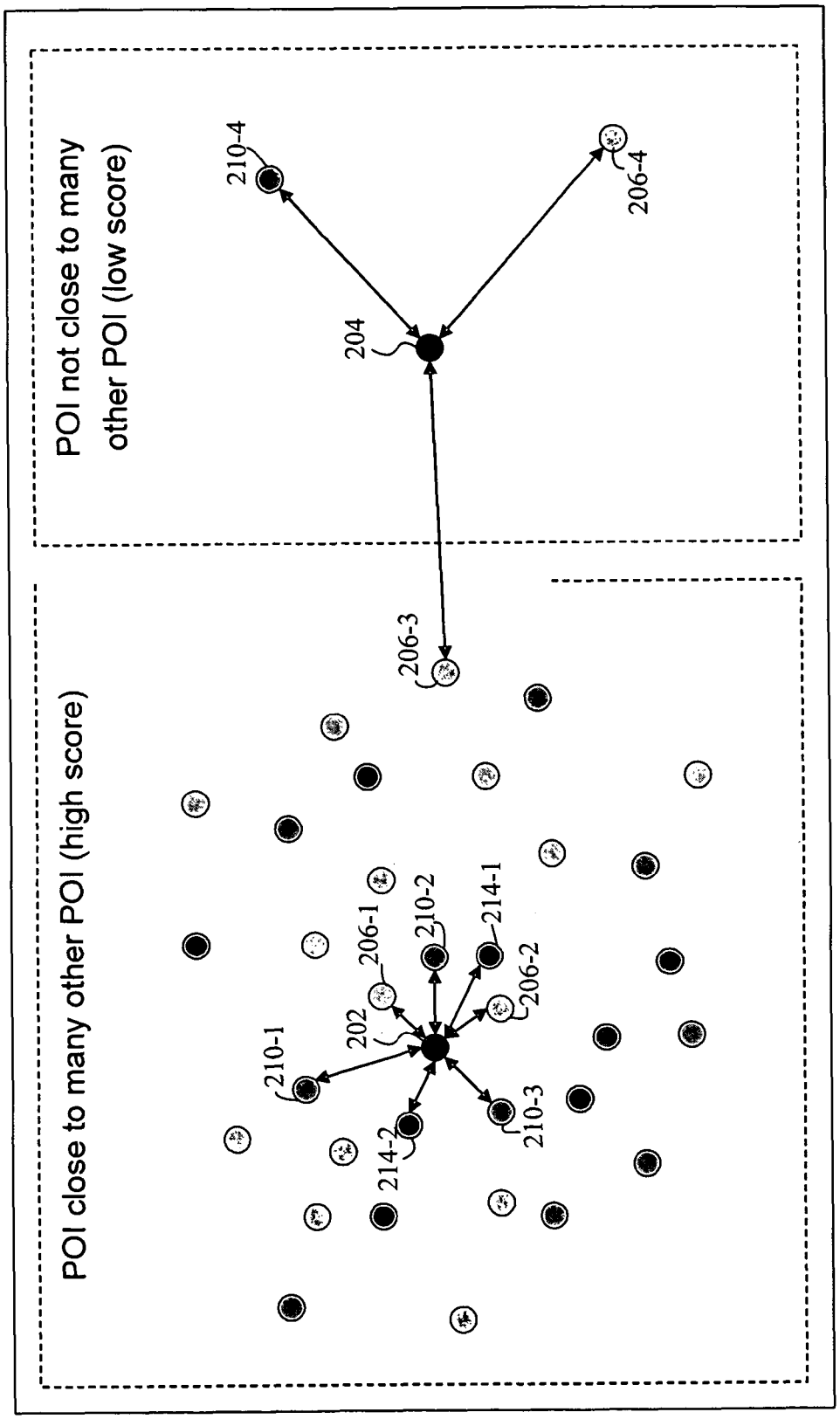
FIG. 2 is a schematic diagram of a method, according to an embodiment of the present invention, for computing a relevance score of a target point of interest based on its proximity to component points of interest.

FIG. 2 illustrates a schematic example of a basic concept of a method for computing a relevance score, also referred to herein as a POI proximity score, of a target point of interest based on its proximity to a cluster of other points of interest (component points of interests). In FIG. 2, each geographically located entity or point of interest has a coordinate that places it in relation to other POIs. It is possible to compute a score for a particular POI, e.g., POI 202 based on its proximity to other nearby POI. For the purposes of understanding the advantages of the present invention, a POI for which a score is sought is termed the target POI and each of the POI proximate to the target POI that will be used to compute the score for the target POI are termed component POI. However, it will be understood that a target POI in one calculation can be a component POI in another calculation. For example, in the instance illustrated in FIG. 2, POI 202 is a target POI whereas POI 210-1 is a component POI. However, in another calculation the target POI could be POI 210-1 and the component POIs could include POI 202. In this other calculation, the goal would be to compute a score for POI 210-1. Another point is that the target POI and the component POI do not have to be the same type. For example the target POI can be a hotel and all or a portion of the component POI can be restaurants, tourist attractions, and the like.

Returning to FIG. 2, the score for POI 202 can take any combination of the following factors into account: (a) the distance between the target POI and each nearby component POI, and (b) an independent importance factor, or weight, for each component POI. In general, the more points of interest that are nearby, and the shorter the distance to each of those points of interest, the higher the POI proximity score is for the target POI. As used here, a high score is associated with a greater relevance. In other words, a higher score for a target POI is indicative of a greater alignment or match between the interests of the user (e.g., traveler) and the features offered by a given target POI (e.g., proximate to those things that for which the user has an interest). In alternative embodiment, relevancy scores in which a lower score indicates greater alignment between the interests of a user and the features of a target POI are provided. However, in order to communicate the advantages and features of the present invention in a consistent manner so that it is best understood, higher scores will be consistently associated with greater alignment of the interests of the users and a given target POI.

Using hotels as an example, according to one embodiment of the present invention, a first hotel 202 that is close to many other points of interest (e.g., POIs 206-1, 206-2, 210-1, 210-2, 210-3, 214-1 and 214-2) receives a higher POI proximity score than a second hotel 204 that is proximate to only a small number of points of interest (e.g., POIs 206-3, 206-4, 210-4) and where this small number of points of interest is, in fact, further away from the second hotel as illustrated in FIG. 2. These POI proximity scores can be used, for example, to sort or filter results of a computer search of hotels.

In FIG. 2 there can be several different component types. For example, in one embodiment, POIs 206 are restaurants, POIs 210 are tourist activities, and POIs 214 are shopping venues. Hotel 202 is close to restaurants 206-1 and 206-2, tourist activities 210-1, 210-2 and 210-3, and stores 214-1 and 214-2, and therefore receives a high POI proximity score. In contrast, hotel 204 is relatively far from even the nearest restaurants 206-3, 206-4 and tourist activity 210-4, and therefore receives a low POI proximity score.

In some embodiments, each component POI is weighted, for example, by any combination of individual user preferences and/or demographic information associated with the user, amenities offered by the POI, reviews of the POI, quality parameters associated with the POI, the cost of renting, using or buying the component POI. To illustrate how user preferences can affect component POI scores, consider the case in which a user specifies that they wish to be closer to restaurants than shopping. In such instances restaurants 206 are assigned a greater weighting factor than stores 214. In another example, each POI 206, 210, and 214 is a different type or class of restaurant, and each are filtered or weighted depending upon the preferences of a user. For example, each POI can be weighted such that four star restaurants have a greater influence on the target POI score (is assigned a greater weight) than three star restaurants. In another example, steak restaurants have a greater influence (are assigned a greater weight) than seafood restaurants.

According to one embodiment of the present invention, a basic algorithm for computing a relevance ranking, or POI proximity score, is as follows:

```
POI_list = list of target POIs for which to compute scores
r = radius to limit proximity searches
d_min = a small offset to avoid division by zero
for each POI in poi_list {
    overall_score = 0
    nearby_list = find_nearby_POI(r)
    for each nearby_POI in nearby_list {
        distance = dist(POI, nearby_POI);
        overall_score += weight(nearby_POI) / (distance + d_min)
    }
    assign_score(POI, overall_score)
}
```

$$\text{Target score of target } POI = \sum_{i=0}^{N} \frac{\text{component } POI \text{ } weight_i}{Dist_i}$$

where N is the number of components within radius r of the target POI and $Dist_i$ is the distance between the $i^{th}$ component POI and the target POI, plus some nominal offset to avoid division by zero.

Figure 3:
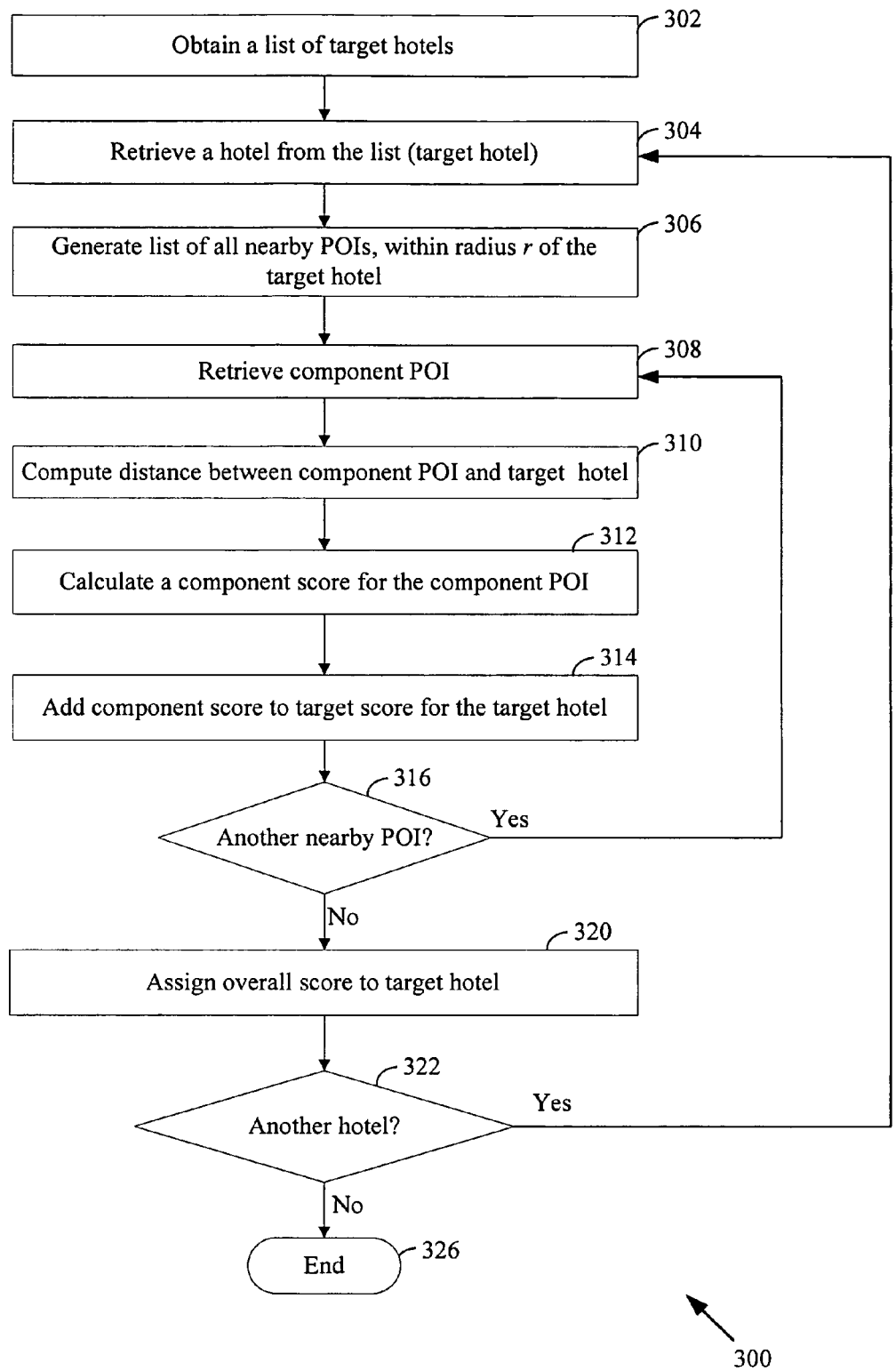
FIG. 3 is a flowchart illustrating a method according to an embodiment of the present invention for computing target point of interest scores that are hotels based on the proximity of such hotels to candidate points of interest.

Referring now to FIG. 3, a version of the above algorithm can be used, for example by system 10, in a method 300 of assigning POI proximity scores to hotels of interest within a particular city or other area.

Step 302. In step 302, system 10 generates a list (may be a list, table, data set, or any other type of data structure, for convenience generally referred to herein as a "list") (e.g., "POI_list" above), for example from hotels stored in property database 44 of FIG. 1. The list can be generated by defining an area of interest; and such area can be any area selected or defined by a user and/or system 10, such as a country, a state, a county, a city, a town, a neighborhood, an area surrounding an airport, attraction or other point of interest. In some embodiments, the list comprises between 5 and 1000 POIs, between 10 and 100 POIs, between 10 and 500 POIs, more than five POIs, more than 10 POIs, or less than 10,000 POIs.

Step 304. In step 304, system 10 retrieves a hotel from the list. This hotel is referred to as the target hotel since it is the hotel for which a score is computed. Since a score will be generated for each hotel in the list defined in step 302, the identity of the hotel retrieved in any given instance of step 304 is not important. Thus, as will be described below, step 304 is, in fact, repeated for each hotel in the list of hotels obtained in step 302.

Figure 4:
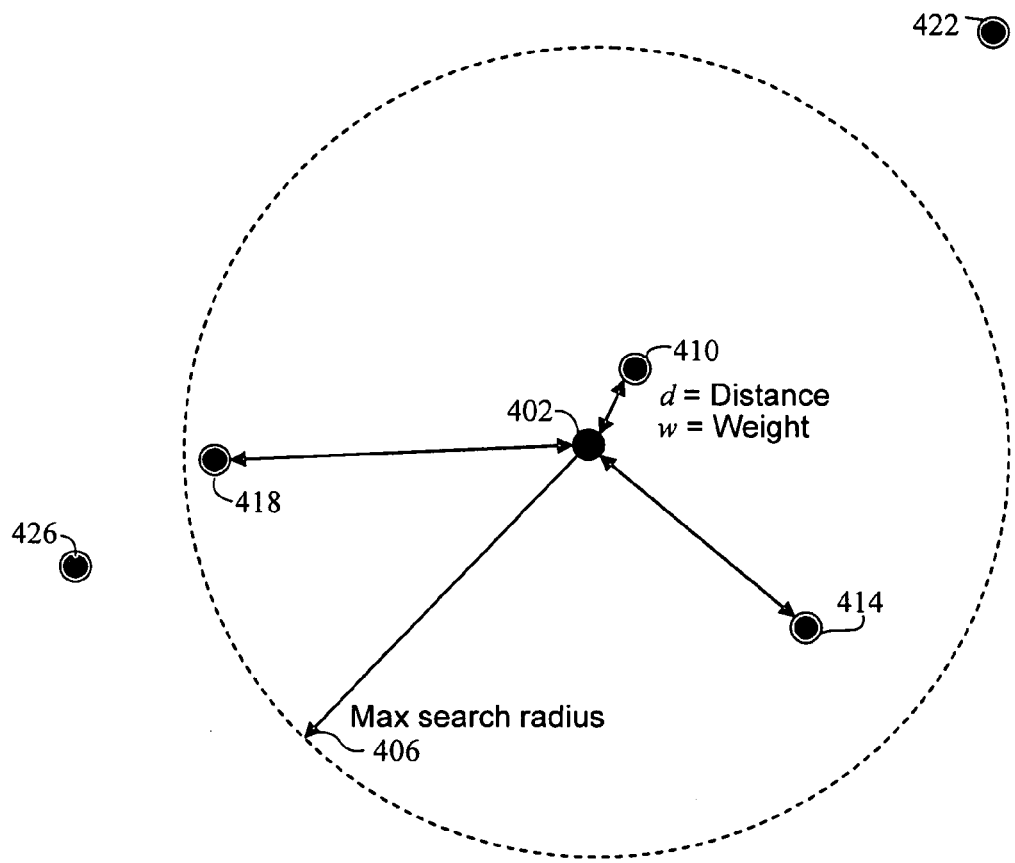
FIG. 4 is a schematic diagram illustrating a method of calculating a point of interest score for a target hotel based on the proximity of the hotel to candidate points of interest, in accordance with one embodiment of the present invention.

Step 306. In step 306, system 10 generates a list (e.g., termed a "nearby_list" in the algorithm presented above) of all nearby POIs within a radius r of the hotel selected in the last instance of step 304 (the target hotel). In one embodiment, POI's outside of radius r are ignored for the purposes of POI calculations related to the target hotel. For example, referring to FIG. 4, POIs 410, 414 and 418 fall within maximum search radius 406 around target hotel 402 and would therefore be included when calculating the POI proximity score for target hotel 402. POIs 422 and 426, however, fall outside of radius r (406) and therefore are not used to compute the score for target hotel 402. Radius r can be any radius defined by system 10 or the user. For example, in some embodiments, radius r is 100 yards or less, 500 yards or less, 1000 yards or less, a mile or less, between 10 feet and 1 mile, two miles or less, five miles or less, or ten miles or less. In some embodiments, radius r, and/or a POI's location inside or outside of radius r, can be determined as shown in FIG. 4 using a straight radius r 406, e.g., "as the crow flies," based upon geographical coordinates of the hotel 402 and the component POIs (e.g., 410, 414, 418, 422, and 426). Alternatively, radius r, and/or a POI's location inside or outside of radius r, can be determined using driving distance, e.g., retrieved from a map database by system 10. Such location and/or map data can be retrieved, for example, from memory 36 or from a remote computer communicating over Internet 34 of FIG. 1. In other embodiments, radius r is based on estimated travel times. For example, in such embodiments, a GUI can be considered a component GUI suitable for use in calculating a score for a target GUI when the estimated driving time between the target GUI and the component GUI is less than some predetermined driving time (e.g., less than one minute, less than five minutes, less than thirty minutes, etc.).

It will be appreciated that in some embodiments the list generated in this step does not need to be created. Rather, a determination of whether a particular POI is within a suitable distance is made on the fly when selecting candidate POI for computation of a score for a target POI. If a given POI is not within a threshold distance (e.g., as measured by traveling directions, geographic coordinates, driving time, etc.) then the POI is ignored and another POI is a master list of POI is considered. As such the list described in step 306 is simply provided to facilitate understanding of the features and advantages of the present invention.

Steps 308 and 310. In step 308 a component POI is selected from the list of POI identified in step 306 (e.g., the "nearby_list"). Then, in some embodiments, in step 310, system 10 determines a distance ($d_1$) between this newly selected component POI and the target hotel. As discussed above, such distances can be based upon straight distance between coordinates of the POI and the hotel, or upon actual travel distances obtained from map data. In some embodiments, this distance has already been precomputed, rendering step 310 unnecessary.

Step 312. In step 312, a component POI score for the component POI retrieved in the last instance of step 308 is computed. In one embodiment, this component score is calculated as:

$$1/(d_1+d\_min)$$

where d_min is a small offset to avoid division by zero. In another embodiment, the component POI score includes a weighting factor $w_1$ related to the component POI, and is calculated as:

$$w_1/(d_1+d\_min).$$

Those of skill in the art will appreciate that there are several different ways that the weight $w_1$ can be assigned to given component POI and all such different ways are within the scope of the present invention. Exemplary ways for assigning such weights have already been described above. For example, in some embodiments, the weight $w_1$ is assigned based on component POI type. For example, all restaurants are assigned a particular constant, for example, 10 relative units (points), 50 relative units, etc. In still another example, five star restaurants are assigned 30 relative units where as fast food restaurants are assigned 3 relative units. In some embodiments, there are several different types of component POIs within radius r of the target POI and each component POI type is assigned the same or different weight (e.g., $w_1$) as a function of component POI type.

In some embodiments, the distance in the denominator is binned and the bin value is used rather than the actual distance. For example, in some embodiments, all possible distances are grouped into ten bins based on actual distance $d_1$. As such, distances less than fifty yards are placed in bin 1 and assigned a value of "1," distances between fifty yards and one hundred yards are placed in bin 2 and assigned a value of "2" and so forth. Such binning can allow for nonlinear application of distance based weights. For example, in some embodiments, bins representing closer distances between the target POI and the component POIs are assigned disproportionally smaller values relative to bins representing larger distances in order to up-weight component POIs that are closer to a target POI over and above the linear weight used in embodiments described above.

Step 314. In step 314, the component POI score is added to the overall score (which in the exemplary algorithm above begins at zero) for the target hotel. As shown in FIG. 4 and the accompanying equation, the score for each POI 410, 414, 418 relative to a hotel 402 is summed to calculate the overall score for the target hotel. In one embodiment, the d_min offset term is not used. Instead, a minimum distance from the hotel is used, e.g. 0.2 mile or 0.1 mile. Any POI inside the defined minimum distance from the hotel is deemed to be at the minimum distance for the purposes of score calculations. For example, a POI that is across the street and a POI that are adjacent to the target hotel are each deemed to be at a minimum distance from the hotel (e.g. fifty yards). The rational behind such embodiments is that there is little perceived value to a user between a POI that is adjacent to the target hotel and one that is across the street from the target hotel.

Step 316. Referring again to FIG. 3, when another component POI is present within radius r of the target hotel (step 316—Yes), additional component scores need to be computed. In such instances, process control returns to step 308 where another component POI is retrieved. In this way, the loop defined by steps 308 through 316 is repeated until all component POI within a radius r of the target POI have been computed. In some embodiments, step 314 is not performed. Rather, component scores computed in successive instances of step 312 are merely tracked and summed in one step after completion of all instances of loop 308-316. As such, optional step 314 is merely described to assist in the explanation of the advantageous algorithms of the present invention.

Step 320. When a component score has been computed for each component POI within the threshold distance r of the target hotel (316—No), the overall score (target score) is assigned to the target hotel. In other words, after the component scores from all POIs within radius r of the first hotel are added to the overall score for the target hotel, the overall score for that target hotel is assigned in step 320.

Step 322. Process steps for assigning a score to a target hotel have been described. In step 322, a determination is made as to whether a score has been assigned to each hotel in the list generated in step 302. If not (step 322—Yes), process control returns to step 304 where another hotel that has not been assigned an overall score is fetched from the list of hotels obtained in step 302. In accordance with the algorithm presented above, in some embodiments, for each remaining hotel present on the "POI_list" of hotels, system 10 retrieves the hotel and repeats steps 306-320. The process is complete (322—No; step 326) when every hotel within the defined area, or on the "POI_list" of hotels, is assigned an overall score. Such overall scores can be stored, for example, as Nearby POI Information 54-1 in memory 36 of FIG. 1.

In some embodiments, method 300 or other methods of assigning POI proximity scores for hotels or other properties or destinations are pre-computed and stored, e.g., by a computer system such as system 10. In other embodiments, POI proximity scores and/or weighting or modification of such scores, are done in real-time or near real-time using, for example, user preferences, updated review data, price data, or the like.

Referring now to FIGS. 5-8, target scores that have been assigned as described above to hotels or other properties can be used, for example by system 10 or another suitable computer system or computer search engine, in a method 500 to filter, rank and/or sort the subject hotels or subject properties. For example, in step 502, system 10 receives a query for hotels in a particular area, and retrieves corresponding hotel records in step 504, e.g., from property database 44 of FIG. 1.

In step 506, the retrieved records are sorted, for example using one or more default sort parameters such as hotel popularity, name, price, or hotel class. In step 508, system 10 returns a web page or other document with the sorted hotel results, including, for example, high level information related to each hotel. The returned page preferably also includes options allowing the user to further refine or sort the query results. In particular, the returned page preferably includes a function allowing the user to sort or refine the query using POI information, for example including the POI proximity scores described above and information related to each POI.

Figure 6:
FIG. 6 is a portion of an exemplary web page displaying a list of hotels according to an embodiment of the present invention.

FIG. 6 illustrates a portion of an exemplary page 600 returned to a user in step 508. In this example, the defined area of the search is for hotels in Los Angeles. Page 600 includes a list of results 602 for a number of hotels. Sort parameters 612 in this example include Popularity, Name, Lowest Price, and Highest Class, with Popularity being the default parameter initially used. Each hotel result 602 includes top-level information such as user rating, hotel class, average price, and neighborhood. In column 610 of page 600, additional selectable options are listed for refining the query results. In particular, a "Close To" region 614 provides selectable options to refine results using POI scores and related information as described above. In this example, options are shown for refining the query results by Restaurants 616, Night Life 618, and Attractions 620.

Figure 5:
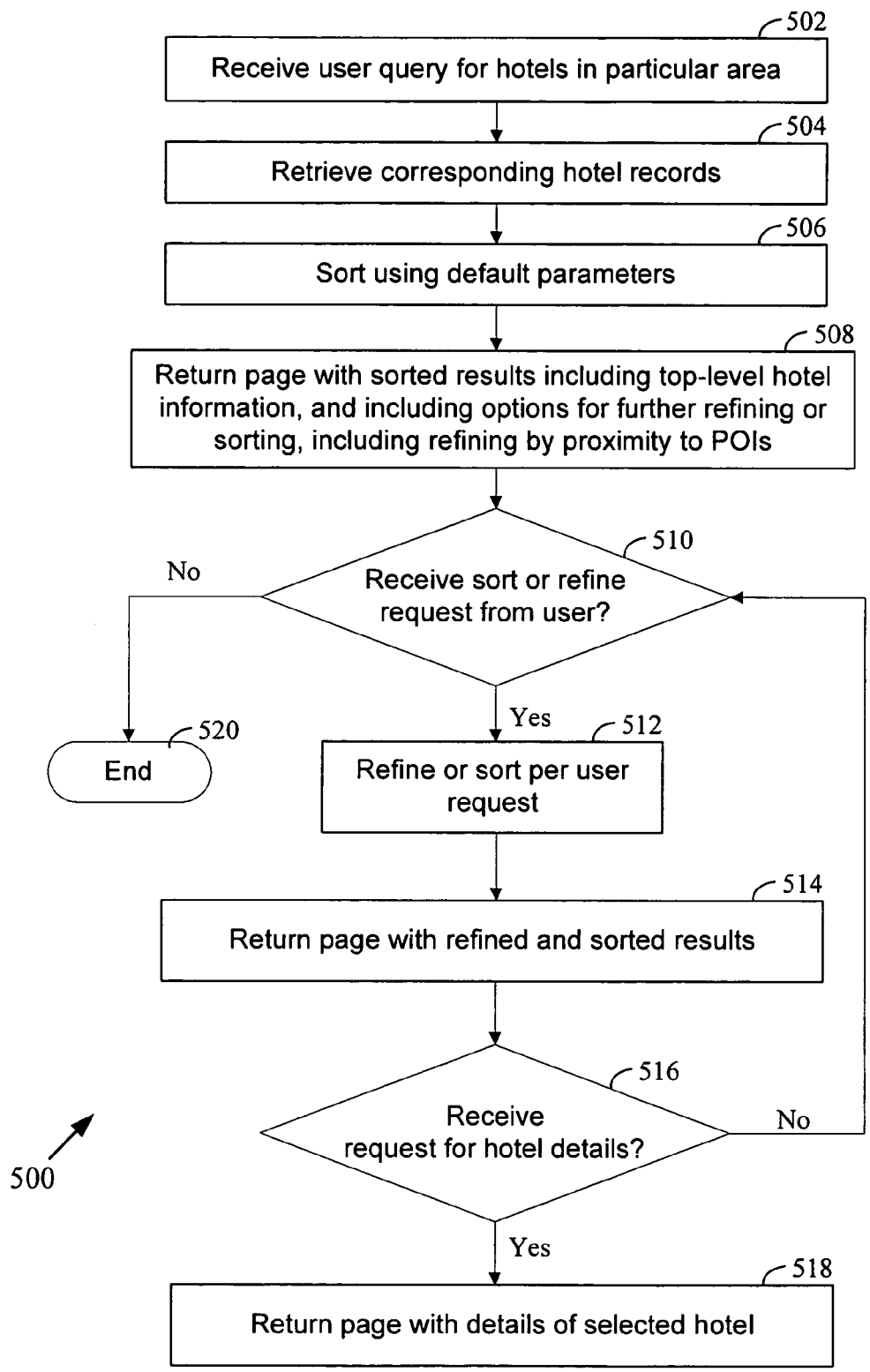
FIG. 5 is a flowchart illustrating a method of refining hotel search results using proximity scores, in accordance with an embodiment of the present invention.

If a user selects one of options 616, 618, 620, or any other refine options in area 610 or sort options in area 612, system 10 receives the request in step 510 of FIG. 5 and refines or sorts the results in accordance with the user's request in step 512. System 10 returns a refined or sorted page to the user in step 514.

Figure 7C:
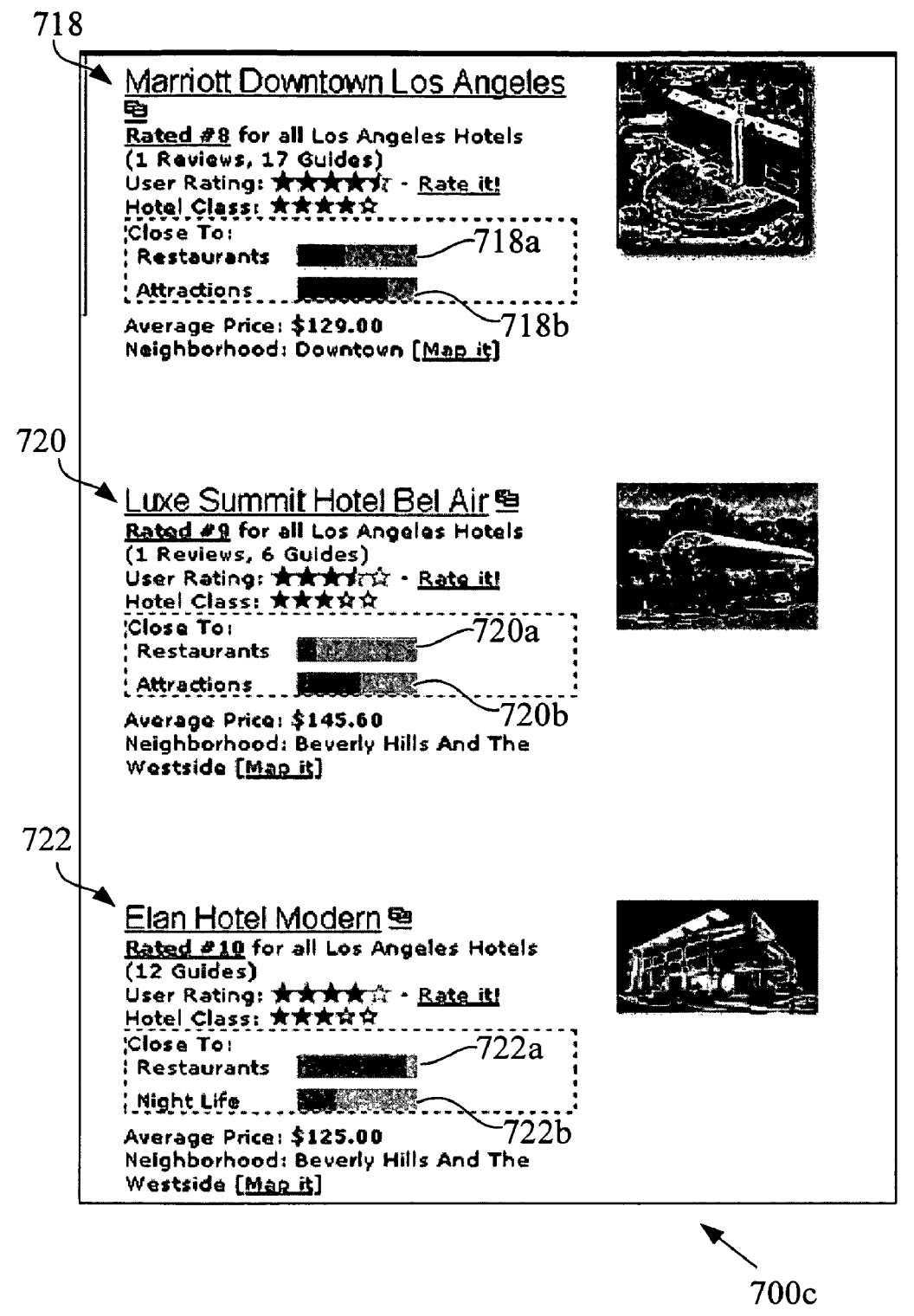

FIGS. 7A-7C includes exemplary portions of pages that can be returned when a user requests, for example, to refine the results by nearby Restaurants 616. Like page 600, page portion 700a includes top-level information for each result 702. However, each result 702 now includes information regarding the corresponding hotel's proximity to restaurants and other points of interest, e.g., 702-Xa. FIG. 7A illustrates a useful application of the novel target scores of the present invention. The proximity information for each hotel that is quantified by the target POI scores can be presented in a variety of ways, for example using language based descriptors such as "Close To: Many Restaurants, Some Attractions" 702a. As such, in some embodiments, the target POI scores are not presented in a numerical fashion to the user. In other embodiments, the POI proximity scores are presented to the user either directly, or using some qualifier such as disclosed below in conjunction with FIG. 7B and FIG. 7C.

In FIG. 7B, quantitative descriptions of restaurant proximity are shown in 710a, 712a, 714a, and 716a, for each hotel 710, 712, 714 and 716, respectively. For example, hotel 710 is located close to 20 attractions and 34 restaurants. As shown in the page portion 700c of FIG. 7C, another method for displaying such proximity information includes graphical representations. Each hotel result 718, 720, 722, includes bar graphs depicting the relative number of restaurants 718a, 720a, 722a, attractions 718b, 720b or night life 722b, for example within a particular distance of the corresponding hotel. One will appreciate that relevance scores or other POI information described herein can also be displayed and/or used to filter, refine or sort query results.

Returning again to FIG. 5, in one embodiment, when a user selects or requests details for a particular hotel, system 10 receives the request (step 516) and returns a page including details regarding the selected hotel. Such an example is page 800 of FIG. 8. Example page 800 includes additional information 802 regarding the selected hotel, including a description with amenities. Proximity scores, data or other information 804 may also be included. In addition, in one embodiment, page 800 also includes detailed user reviews 810 and an option to map nearby points of interest, including hotels, restaurants, shopping, things to do, and entertainment.

Figure 9:
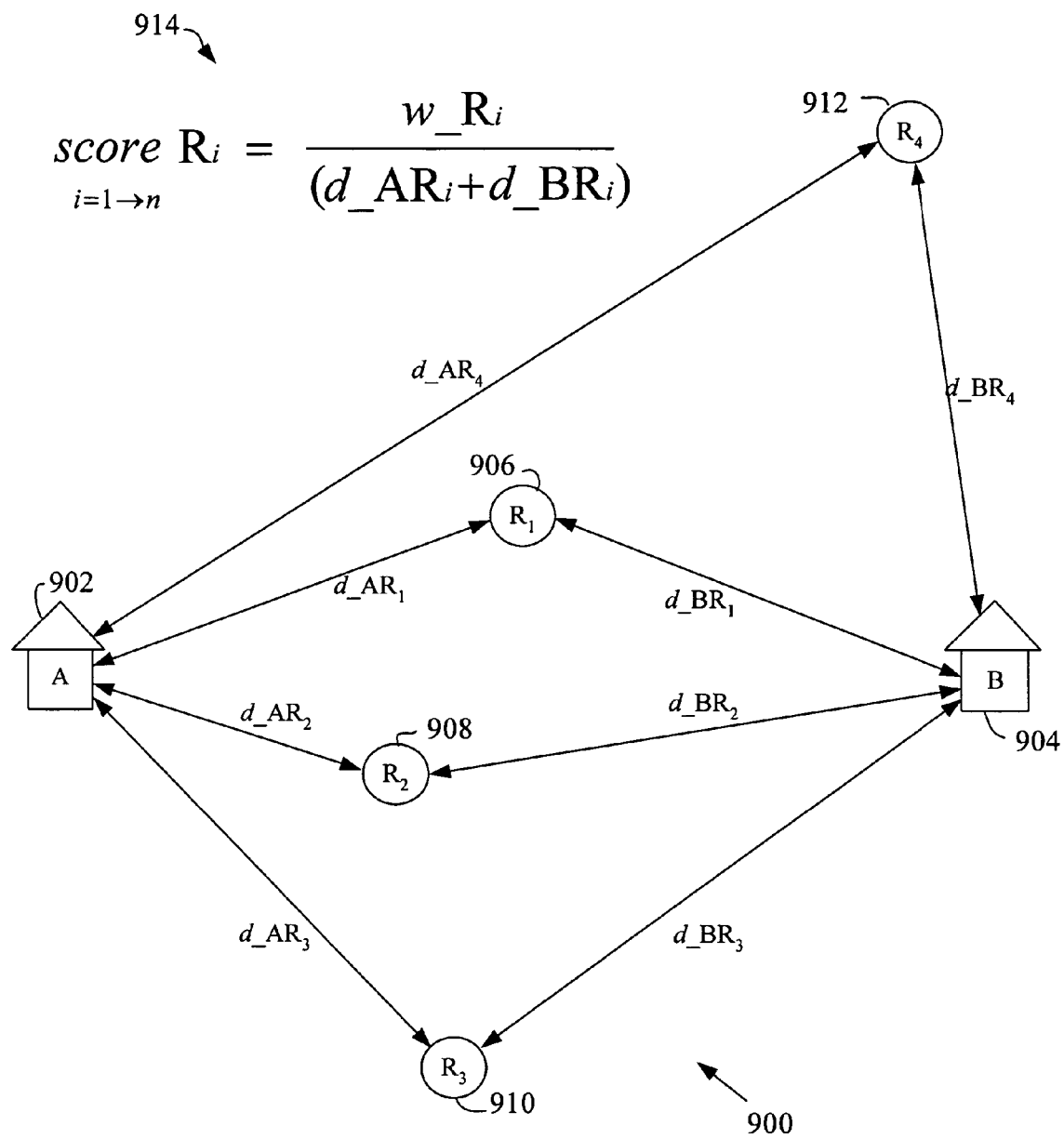
FIG. 9 illustrates still another method for computing relevance ranking of a point of interest according to the present invention.

Referring to FIG. 9, according to another embodiment of the present invention, the target scoring functions of the present invention is used as a proximity determinations tool for determining a mutual POI score. Thus mutual POI score can be used for ranking, filtering or sorting possible locations for a meeting between two or more people. Such locations can include, for example, a restaurant, a bar, a coffee shop, an office, a shopping mall, a store, a park, or any other point of interest. In the schematic example of FIG. 9, a person at location A (902) and a person at location B (904) would like to meet at a mutually convenient and desirable location, in this case a restaurant $R_1$ (906), $R_2$ (908), $R_3$ (910) or $R_4$ (912). The potential restaurant locations can be determined, for example, by filtering a database with restaurants such as POI database 56 of FIG. 1 using a maximum radius or travel distance from location 902 and/or 904 as described above. In some embodiments, other parameters, such as restaurant type, class, price, and/or other factors can be used instead of or in addition to a maximum distance parameter to determine a set of possible meeting locations, e.g., $R_1$ (906), $R_2$ (908), $R_3$ (910) and $R_4$ (912).

For each possible location $R_1$ (906), $R_2$ (908), $R_3$ (910), $R_4$ (912), a mutual POI score related to mutual convenience and/or desirability is calculated. For example, using equation 914, the score w_$R_i$ for each restaurant $R_i$ in the set of n restaurants under consideration is inversely related to the sum of the distances between A and $R_i$ and the distance between B and $R_i$ in accordance with the equation:

In some embodiments, an additional weighting factor $w_i$ is applied to each restaurant $R_1$ (906), $R_2$ (908), $R_3$ (910), $R_4$ (912) in accordance with the equation:

In some embodiments, each individual $w_i$ represents the alignment of the user preferences of user A and user B (as well as any other user that plans to attend the meeting) with respect to restaurant type, class, price, and/or other factors. Such user preferences can be obtained from the user profiles of user A and user B (and other users that plan to attend the meeting) in a system in which such users have logged in and maintain such a profile. Alternatively, such user preferences can be determined interactively by prompting the prospective meeting attendees for such information. There is any number of ways in which the alignment of user preferences and the features of a restaurant can be determined, and all such ways are within the scope of the present invention. For example, the alignment, and therefore the score $w_i$, can be a score that is incrementally larger when the preferences of the users match the preferences of the prospective attendees. For example, a fast food restaurant could receive a low score $w_i$ if the majority of the attendees indicate that they prefer four star restaurants. In some embodiments, $w_i$ is a function of how well a given restaurant matches the type of meeting that is proposed. For example, if the meeting is a business lunch, restaurants that have good service or private dining rooms can receive a higher weight $w_i$ than restaurants that do not provide such amenities.

To illustrate the use of equation 914 of FIG. 9, consider the case in weighting factor w_$R_1$ is 10, the distance from A to $R_1$ (e.g., d_$AR_1$) is 2.7 miles, and the distance from B to $R_1$ (e.g., d_$BR_1$) of 2.7 miles. In this example, the mutual POI score for $R_1$ is 10/(2.7+2.7)=1.85. Table 1 below provides sample distances and resulting mutual POI scores for each restaurant R in FIG. 9, assuming an equal weighting factor of 10 for all restaurants:

TABLE 1

Sample mutual POI score

| POI | D_$AR_i$ | d_$BR_i$ | Score |
|-----|----------|----------|-------|
| $R_1$ | 2.7 mi | 2.7 | 1.85 |
| $R_2$ | 1.8 mi | 3.5 | 1.89 |
| $R_3$ | 3.2 mi | 3.8 | 1.43 |
| $R_4$ | 3.1 mi | 5.9 | 1.11 |

Thus, in the example shown in FIG. 9 and Table 1, $R_2$ has the highest mutual POI score as it has is the shortest combined travel distance for A and B. Such information can be used, for example, as described above with respect to FIGS. 6-8, to rank, sort and refine a POI query where a mutually convenient meeting place is desired between two or more locations or parties. Naturally, each restaurant or POI could include a different weighting factor depending upon type of POI, quality, personal preferences, etc. as described above. In some embodiments, each weighting factor w_$R_i$ is derived from a combination of weighting factors, e.g., user A and user B can assign different weighting factors to a given restaurant, and such weighting factors can be summed or otherwise combined when calculating the corresponding mutual POI score.

In some embodiments, it may also be desirable that a meeting location is approximately equidistant or involves similar travel distance for time. In such embodiments, additional weighting or filtering factors can be applied to increase scores for those restaurants or other POIs where the distance from A 902 to the POI is approximately equivalent or similar to the distance from B 904. In other embodiments, additional filtering or weighting can be applied, for example, to those restaurants or other POIs that fall within the intersection of defined radii around A and B, radii. Such radii can be defined, for example, as the distance between A and B, or as some fraction, e.g. 0.75*d_AB.

While the use of restaurants has been used to describe potential meeting places, the invention is not so limited. The meeting place can be a club, bar, home, conference center, hotel, or any other type of establishment that can accommodate meeting attendees in any kind of fashion. Moreover, the systems and methods can be used for purposes other than meetings. For example, it can be used to find the optimal place to purchase a house. In such an embodiment A and B represent the location of where A works and where B works. In such instances, the methods disclosed in FIG. 9 and FIG. 2 can be combined to identify an ideal neighborhood in which user A and user B can rent or buy a home. Such a combined embodiment considers both computing times and the personal interests of user A and user B in order to identify suitable locations.

As in the aspect of the invention described in conjunction with FIG. 2, the embodiments of the invention in accordance with FIG. 9 are not limited to functions that inversely weight on strictly a linear distance scale. Other metrics such as driving distance, estimated driving time can be used in either linear or nonlinear ways.

As noted above, in some embodiments, the systems and methods of the present invention is applied to domains such as real estate. For instance, the target POIs for which target scores are calculated can be houses or apartments, and component POIs can be parks, schools, highway on-ramps, earthquake faults, train tracks, locations of sex offenders, or other locations or points of interest. The weight for each POI can be tied to its type. As such, some component POIs can assigned positive scores (e.g., good schools) that improve a target POI score whereas other component POIs can be assigned negative scores (e.g., sex offenders) that detract from the target POI score.

6. REFERENCES CITED

The present invention can be implemented as a computer program product that comprises a computer program mechanism embedded in a computer readable storage medium. For instance, the computer program product could contain the program modules shown in FIG. 1. These program modules can be stored on a CD-ROM, DVD, magnetic disk storage product, or any other computer readable data or program storage product. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A computerized method of computing a relevance rank of a target point of interest (POI) at a location, the method comprising:
   obtaining a plurality of component points of interest stored in a memory, wherein each component POI in said plurality of component POIs is within the same geographical region as the target POI location; and
   calculating, using instructions stored in the memory, a plurality of component POI scores, each component POI score in the plurality of component POI scores corresponding to a component POI in said plurality of component POI, and wherein
   each respective component POI score in said plurality of component POI scores is determined by a function of a distance between (i) the component POI corresponding to the respective component POI score and (ii) the target POI; and
   said relevance rank of said target POI is a combination of said plurality of component POI scores.

2. The method of claim 1, wherein a component POI score in said plurality of component POI scores is determined by the distance between (i) the component POI corresponding to the component POI score and (ii) the target POI.

3. The method of claim 1, wherein a component POI score in said plurality of component POI scores is determined by an inverse of the distance between (i) the component POI corresponding to the component POI score and (ii) the target POI.

4. The method of claim 1, wherein said target POI is a hotel, a house, an apartment, a real estate parcel, a restaurant, a bar, or a school.

5. The method of claim 1, wherein a component POI score in said plurality of component POI scores is further determined by a weight assigned to the component POI represented by the component POI score.

6. The method of claim 1, wherein a component POI in said plurality of component POI is a restaurant, a hotel, an attraction, an activity, a park, a store, a shopping mall, a school, a highway on-ramp, an earthquake fault, a train track, or a location of a sex offender.

7. The method of claim 6, wherein said weight is determined by a category parameter, a type parameter, a rating parameter, a quality parameter, a price parameter, or a user preference parameter.

8. The method of claim 1, wherein a component POI in said plurality of component POI and the target POI are in the same vicinity when they are in the same state.

9. The method of claim 1, wherein a component POI in said plurality of component POI and the target POI are in the same vicinity when they are in the same county.

10. The method of claim 1, wherein a component POI in said plurality of component POI and the target POI are in the same vicinity when they are in the same city.

11. The method of claim 1, wherein a component POI is assigned a component POI score of zero when the distance between the component POI and the target POI is greater than a threshold value.

12. The method of claim 11, wherein said threshold value is 500 yards or less.

13. The method of claim 12, wherein said threshold value is 1000 yards or less.

14. The method of claim 12, wherein said threshold value is one mile or less.

15. The method of claim 12, wherein said threshold value is between 10 feet and 1 mile.

16. The method of claim 12, wherein the distance between the component POI and the target POI is computed as a direct distance between the component POI and the target POI.

17. The method of claim 12, wherein the distance between the component POI and the target POI is computed as a driving or walking distance between the component POI and the target POI.

18. The method of claim 12, wherein the distance between the component POI and the target POI is computed as the driving time between the component POI and the target POI.

19. The method of claim 1, wherein the first plurality of component POIs consists of between 5 and 1000 POIs.

20. The method of claim 1, wherein the first plurality of component POIs comprises more than five POIs.

21. The method of claim 1, wherein the first plurality of component POIs consists of less than 10,000 POIs.

22. A computer system for computing a relevance rank of a target point of interest (POI) at a location, the computer system comprising:
   a central processing unit; and
   a memory coupled to the central processing unit, the memory storing:
   instructions for accessing a property data structure, wherein said property data structure comprises information about said target POI,
   instructions for accessing a POI data structure, and
   instructions for accessing a proximity processing module, wherein the proximity processing module comprises:
   instructions for obtaining a plurality of component points of interest from said POI data structure, wherein each component POI in said plurality of component POIs is within the same geographical region as the target POI location, and
   instructions for calculating a plurality of component POI scores, each component POI score in the plurality of component POI scores corresponding to a component POI in said plurality of component POI, and wherein:
   each respective component POI score in said plurality of component POI scores is determined by a function of a distance between (i) the component POI corresponding to the respective component POI score and (ii) the target POI, and
   said relevance rank of said target POI is a combination of said plurality of component POI scores.

23. The computer system of claim 22, wherein said property data structure is resident in said memory.

24. The computer system of claim 22, wherein said property data structure is located in a computer that is addressable by said computer system across a network.

25. The computer system of claim 22, wherein said POI data structure is resident in said memory.

26. The computer system of claim 22, wherein said POI data structure is located in a computer that is addressable by said computer system across a network.

27. The computer system of claim 22, wherein a component POI score in said plurality of component POI scores is determined by the distance between (i) the component POI corresponding to the component POI score and (ii) the target POI.

28. The computer system of claim 22, wherein a component POI score in said plurality of component POI scores is determined by an inverse of the distance between (i) the component POI corresponding to the component POI score and (ii) the target POI.

29. The computer system of claim 22, wherein said target POI is a hotel, a house, an apartment, a real estate parcel, a restaurant, a bar, or a school.

30. The computer system of claim 22, wherein a component POI in said plurality of component POI is a restaurant, a hotel, an attraction, an activity, a park, a store, a shopping mall, a school, a highway on-ramp, an earthquake fault, a train track, or a location of a sex offender.

31. The computer system of claim 22, wherein a component POI score in said plurality of component POI scores is further determined by a weight assigned to the component POI represented by the component POI score.

32. The computer system of claim 31, wherein said weight is determined by a category parameter, a type parameter, a rating parameter, a quality parameter, a price parameter, or a user preference parameter.

33. The computer system of claim 22, wherein a component POI in said plurality of component POI and the target POI are in the same vicinity when they are in the same city.

34. The computer system of claim 22, wherein a component POI is assigned a component POI score of zero when the distance between the component POI and the target POI is greater than a threshold value.

35. The computer system of claim 34, wherein the distance between the component POI and the target POI is computed as a direct distance between the component POI and the target POI.

36. The computer system of claim 34, wherein the distance between the component POI and the target POI is computed as a driving or walking distance between the component POI and the target POI.

37. The computer system of claim 34, wherein the distance between the component POI and the target POI is computed as the driving time between the component POI and the target POI.

38. A computer program product for determining a target location, the computer program product comprising a computer readable storage medium and a computer program mechanism embedded therein, the computer program mechanism comprising:

instructions for obtaining, over the Internet, a location of a first person associated with the target location;
instructions for obtaining, over the Internet, a location of a second person associated with the target location; and
instructions for computing, for each respective candidate location in a plurality of candidate locations, a score that is a function of both (i) a distance between the location of the first person and the respective candidate location and (ii) a distance between the location of the second person and the candidate location, wherein the candidate location in the plurality of candidate locations that receives the best score is deemed to be the target location.

39. A computerized method of determining a target location, the method comprising:

obtaining, over the Internet, a location of a first person associated with the target location;
obtaining, over the Internet, a location of a second person associated with the target location;
computing, using instructions stored in a computer readable storage medium, for each respective candidate location in a plurality of candidate locations, a score that is a function of both (i) a distance between the location of the first person and the respective candidate location and (ii) a distance between the location of the second person and the candidate location, wherein the candidate location in the plurality of candidate locations that receives the best score is deemed to be the target location.

40. The method of claim 39, herein the distance between the location of the first person and the respective candidate location is computed as a direct distance.

41. The method of claim 39, wherein the distance between the location of the first person and the respective candidate location is computed as a driving or walking distance.

42. The method of claim 39, wherein the distance between the location of the first person and the respective candidate location is computed as the driving time.

43. The method of claim 39, wherein the target location is a meeting place for the first person and the second person.

44. The method of claim 39, wherein the target location is associated with additional people and the location of these additional people is used to identify the target location from among the plurality of candidate locations based on the respective distances of each of the additional people and the geographic positions of each of the candidate locations in the plurality of candidate locations.

45. The method of claim 39, wherein
the target location is a place for the first person and second person to rent or buy;
the location of the first person is the place where the first person works or goes to school; and
the location of the second person is the place where the second person works or goes to school.

46. A computer system for determining a target location, the computer system comprising:

a central processing unit; and
a memory, coupled to the central processing unit, the memory storing:
instructions for obtaining, over the Internet, a location of a first person associated with the target location,
instructions for obtaining, over the Internet, a location of a second person associated with the target location, and
instructions for computing, for each respective candidate location in a plurality of candidate locations, a score that is a function of both (i) a distance between the location of the first person and the respective candidate location and (ii) a distance between the location of the second person and the candidate location, wherein the candidate location in the plurality of candidate locations that receives the best score is deemed to be the target location.

47. A computer program product for computing a relevance rank of a target point of interest (POI) at a location, the computer program product comprising a computer readable storage medium and a computer program mechanism embedded therein, the computer program mechanism comprising:

instructions for accessing a property data structure, wherein said property data structure comprises information about said target POI;
instructions for accessing a POI data structure; and
instructions for accessing a proximity processing module, wherein the proximity processing module comprises:

instructions for obtaining a plurality of component points of interest from said POI data structure, wherein each component POI in said plurality of component POIs is within the same geographical region as the target POI location; and instructions for calculating a plurality of component POI scores, each component POI score in the plurality of component POI scores corresponding to a component POI in said plurality of component POI, and wherein:

each respective component POI score in said plurality of component POI scores is determined by a function of a distance between (i) the component POI corresponding to the respective component POI score and (ii) the target POI; and said relevance rank of said target POI is a combination of said plurality of component POI scores.

\* \* \* \* \*